United States Patent
Park

(10) Patent No.: US 8,338,771 B2
(45) Date of Patent: Dec. 25, 2012

(54) APPARATUS FOR TRACKING AND CONDENSING SUNLIGHT OF SLIDING TYPE

(75) Inventor: Young Hwan Park, Pyeongtaek-si (KR)

(73) Assignee: Green Plus Co., Ltd. (KR)

( * ) Notice: Subject to any disclaimer, the term of this patent is extended or adjusted under 35 U.S.C. 154(b) by 252 days.

(21) Appl. No.: 12/940,851

(22) Filed: Nov. 5, 2010

(65) Prior Publication Data

US 2012/0111389 A1    May 10, 2012

(51) Int. Cl.
*H01L 31/052* (2006.01)
*G01C 21/02* (2006.01)

(52) U.S. Cl. ............. 250/203.4; 250/203.1; 136/246; 126/576; 126/605

(58) Field of Classification Search ............ 250/203.1, 250/203.3, 203.4; 136/246, 251, 259; 126/576, 126/600, 605, 684
See application file for complete search history.

(56) References Cited

U.S. PATENT DOCUMENTS

| | | | | |
|---|---|---|---|---|
| 6,969,717 B2* | 11/2005 | Bhide et al. | .......... | 514/243 |
| 7,795,568 B2* | 9/2010 | Sherman | .......... | 250/203.4 |
| 8,188,413 B2* | 5/2012 | Kats et al. | .......... | 250/203.4 |

* cited by examiner

*Primary Examiner* — Kevin Pyo
(74) *Attorney, Agent, or Firm* — John K. Park; Park Law Firm

(57) ABSTRACT

There is provided an apparatus for tracking and condensing sunlight of a sliding type which tracks a direction of sunlight according to variations of an altitude or orbit of the sun pivots a solar module plate to maximize condensing efficiency, and strengthens a fixing structure on an inclined ground or inclined building surface by suing a frame structure on the bottom without using a concrete base harmful to natural environment.

7 Claims, 9 Drawing Sheets

APPARATUS FOR TRACKING AND
CONDENSING SUNLIGHT OF SLIDING TYPE

TECHNICAL FIELD

The present invention relates to an apparatus for condensing sunlight, and more particularly, to an apparatus for tracking and condensing sunlight of a sliding type which tracks a direction of sunlight according to variations of an altitude or orbit of the sun, pivots a solar module plate to maximize condensing efficiency, and strengthens a fixing structure thereof.

BACKGROUND ART

In general, sunlight generation indicates a generation method for converting sunlight directly into electric power via a solar battery.

As compared with other types of generation, solar energy generation generates clean energy without air pollution, noise, heat generation, vibration, etc., seldom requires fuel transfer and maintenance and management of generation equipment, increases a lifespan of an apparatus, and simplifies decision of an equipment scale and installation works.

A sunlight generation system has advantages in that an energy source is clean and infinite, and the generation system is easily maintained and repaired, can be implemented into a unmanned system and has a long lifespan.

FIG. 1 shows a conventional apparatus for condensing sunlight of a fixed type. The conventional apparatus has the cheapest stable structure, and is mostly used in a comparatively remote region where an installation area is not limited. Particularly, the conventional apparatus is normally installed in an island of a strong wind velocity. The conventional apparatus adopts an array supporting method relatively often used because initial installation costs are small and no difficulty occurs in repair and management. A domestic sunlight system for an island has been standardized as the fixed type system.

In addition, there may be used an apparatus for two-way condensing sunlight of a fixed type, wherein the foregoing fixed type structures are installed in both directions.

However, since the conventional apparatus for condensing sunlight of the fixed type is fixedly installed to face one direction, when sunlight is optimally condensed on one surface, sunlight efficiency is reduced on the other opposite surface. As a result, condensing efficiency of the overall system is lowered according to variations of an altitude or orbit of sunlight.

Moreover, when a means for fixing and pivoting a solar module plate is installed, a fixing structure thereof is weak to wind or load.

DISCLOSURE

Technical Problem

Accordingly, the present invention is conceived to solve the aforementioned problems in the prior art. An object of the present invention is to provide an apparatus for tracking and condensing sunlight of a sliding type which tracks a direction of sunlight according to variations of an altitude or orbit of the sun and pivots a solar module plate so as to maximize condensing efficiency.

In addition, another object of the present invention is to provide a structure strong against wind or load by firmly fixing a means for fixing a solar module plate to an inclined ground or inclined building surface and pivoting the solar module plate to the bottom by a frame structure, without using a concrete base which is harmful to natural environment.

Technical Solution

According to an aspect of the present invention for achieving the above objects, there is provided an apparatus for tracking and condensing sunlight of a sliding type, comprising: a lower structure; an upper structure which is formed on a top end of the lower structure in the shape of an inverse triangle and has a space portion at the center, a rotation shaft including a bearing being formed on a top end of which; a solar module plate which condenses sunlight; a rotation plate which pivots in the left-right direction as a central portion of a bottom surface of which is fixed to a top end of the rotation shaft, the solar module plate being formed on a top surface of which; a roller guide which is formed in the space portion at the center of the upper structure along a rotation radius around the rotation shaft; a rotation push rod roller which is formed to be movable with the roller guide; respective rotation push rods which have one ends fixed to both sides of the bottom surface of the rotation plate and the other ends hinge-coupled to the rotation push rod roller; a motor which is formed on the lower structure; a rack pinion which converts a rotational motion of the motor into a linear motion; a driven pipe which is formed on the lower structure and coupled to the rack pinion to perform a linear motion in the left-right direction; and a roller link which has one side hinge-coupled to the driven pipe and the other side hinge-coupled to the rotation push rod roller, and moves the rotation push rod roller along the roller guide in the rotation radius, when the driven pipe moves horizontally.

In addition, the apparatus further includes a driving pipe which is extended in a lateral direction to rotate with the motor, wherein a plurality of rack pinions and a plurality of driven pipes corresponding thereto are further formed on the driving pipe at certain intervals to interoperate with each other.

The respective rotation push rods are formed in the shape of a bracket such that one ends thereof are fixed to four-side edges of the bottom surface of the rotation plate, respectively, and the other ends thereof are hinge-coupled to one point of the rotation push rod roller.

The apparatus further includes a rack pinion support beam which is formed on the lower structure in the same direction as the rack pinion to support the rack pinion.

The apparatus further includes a watering equipment which is formed in the space portion at the center of the upper structure to supply water to a lower portion, a spring cooler which is formed at one side of the rotation plate to spray water to the surface of the solar module plate, and a nutrient solution cultivation device which is formed below the upper structure to accommodate plants and supply a nutrient solution thereto.

Moreover, preferably, the apparatus further includes a light tracking and driving controller which tracks an orbit or altitude of the sun and outputs signals of different sizes according to the tracked orbit or altitude of the sun, wherein the motor rotates normally and reversely according to the sizes of the signals output from the light tracking and driving controller, to pivot the plurality of rotation plates with the solar module plate formed thereon in the left-right direction and change angles thereof according to sunlight.

Further, the lower structure may be a roof truss, and the upper structure may be fixed with a sandwich panel formed on a top end of the roof truss.

Advantageous Effects

According to the present invention, the apparatus for tracking and condensing sunlight of the sliding type can track the direction of sunlight according to variations of the altitude or orbit of the sun and pivot the solar module plate so as to maximize condensing efficiency.

In addition, the apparatus for tracking and condensing sunlight of the sliding type can provide the structure strong against wind or load by firmly fixing the means for fixing the solar module plate to the inclined ground or inclined building surface and pivoting the solar module plate to the bottom by the frame structure, without using the concrete base which is harmful to natural environment.

Moreover, while the prior art causes many environmental problems such as washout due to the concrete base, the present invention takes an economical advantage because a pitch can be easily set on the inclined surface using a special lower structure.

Figure 1:
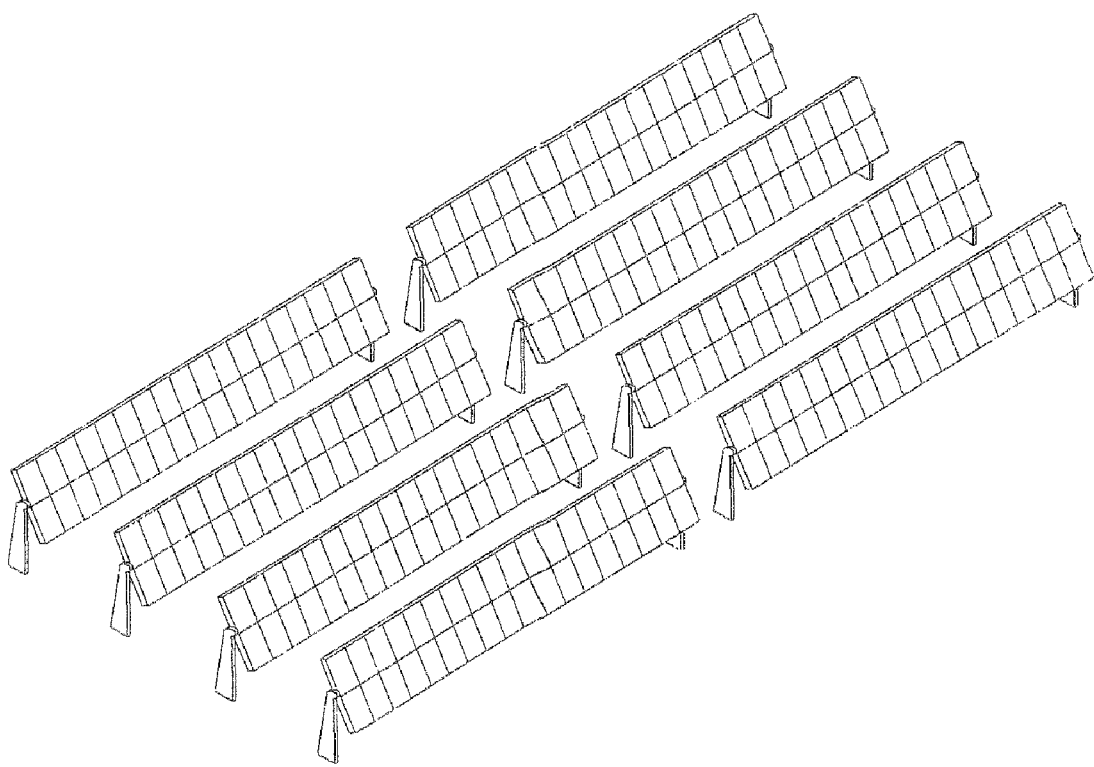
FIG. 1 is a perspective view illustrating a conventional apparatus for tracking and condensing sunlight of a fixed type.

[Explanation of Reference Numerals for Major Portions Shown in Drawings]

| | |
|---|---|
| 100: | Light tracking and driving controller |
| 101: | Solar module plate |
| 102: | Upper structure |
| 103: | Bearing |
| 104: | Rotation shaft |
| 105: | Rotation plate |
| 106: | Rotation push rod |
| 107: | Rack pinion |
| 108: | Roller guide |
| 109: | Driven pipe |
| 110: | Rack pinion support beam |
| 111: | Rotation push rod roller |
| 112: | Motor |
| 113: | Driving pipe |
| 114: | Lower structure |
| 115: | Roller link |
| 116: | Watering equipment |
| 117: | Roof truss |
| 118: | Sandwich panel |
| 119: | Spring cooler |
| 120: | Nutrient solution cultivation device |
| 121: | Nutrient solution cultivation port |
| 122: | Nutrient solution supply tube |

BEST MODE FOR INVENTION

Hereinafter, exemplary embodiments of the present invention will be described in detail, with reference to the accompanying drawings.

Figure 2:
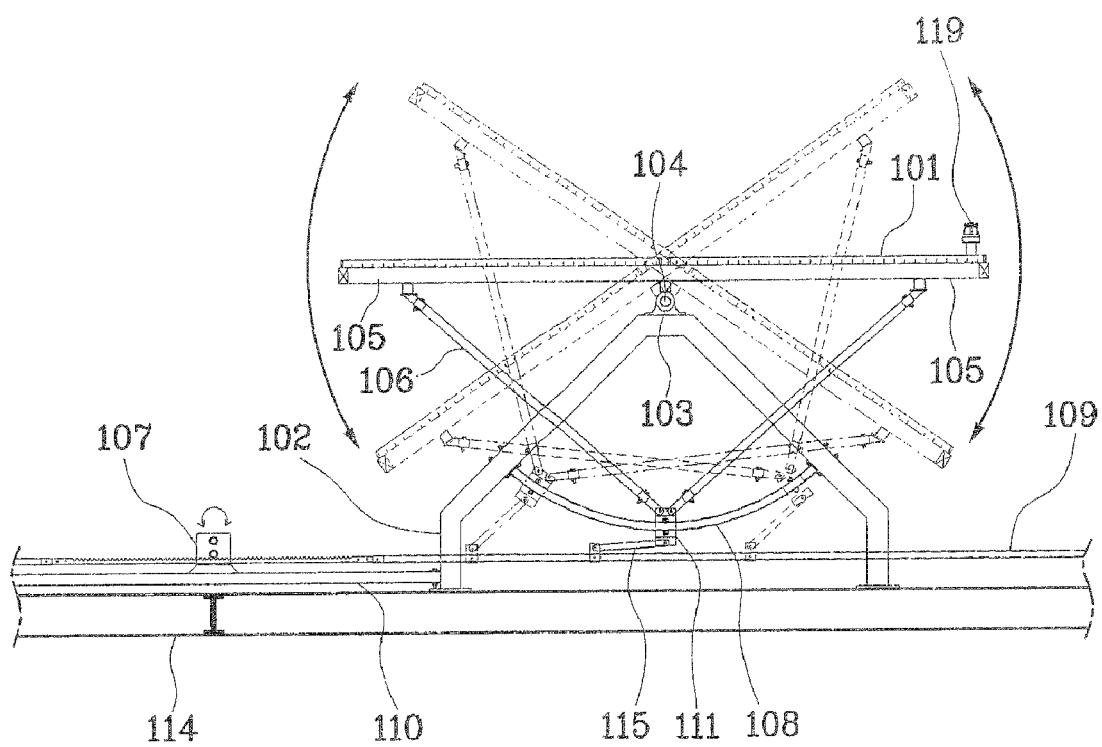
FIG. 2 is a side view illustrating an apparatus for tracking and condensing sunlight of a sliding type according to the present invention.
Figure 3:
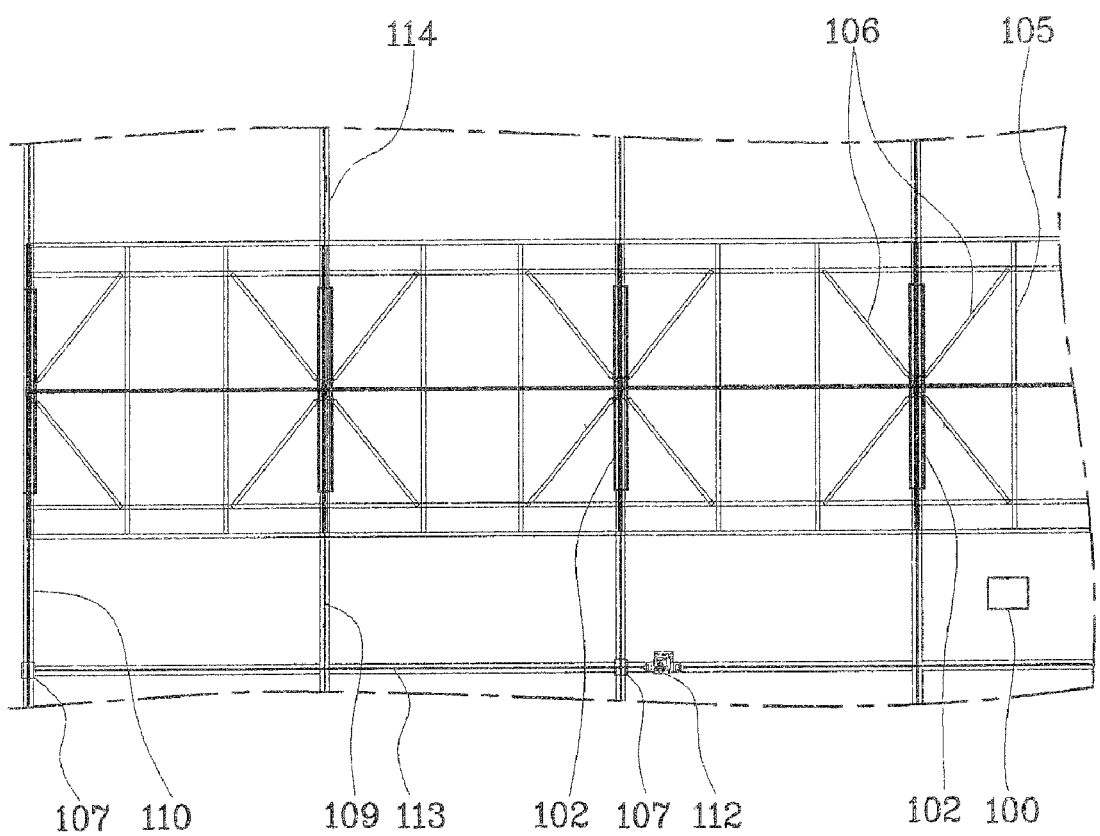
FIG. 3 is a plane view of FIG. 2.
Figure 4:
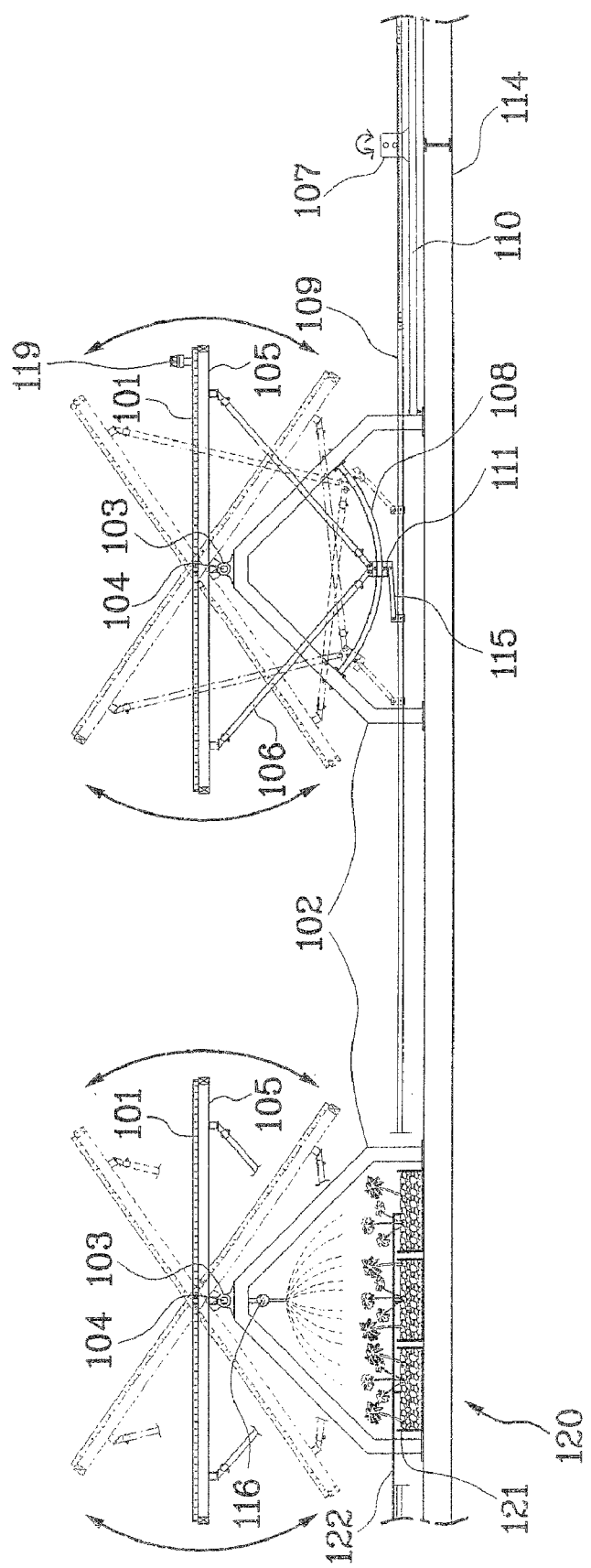
FIG. 4 is a side view illustrating the apparatus of FIG. 2 when it is provided with a watering equipment.
Figure 5:
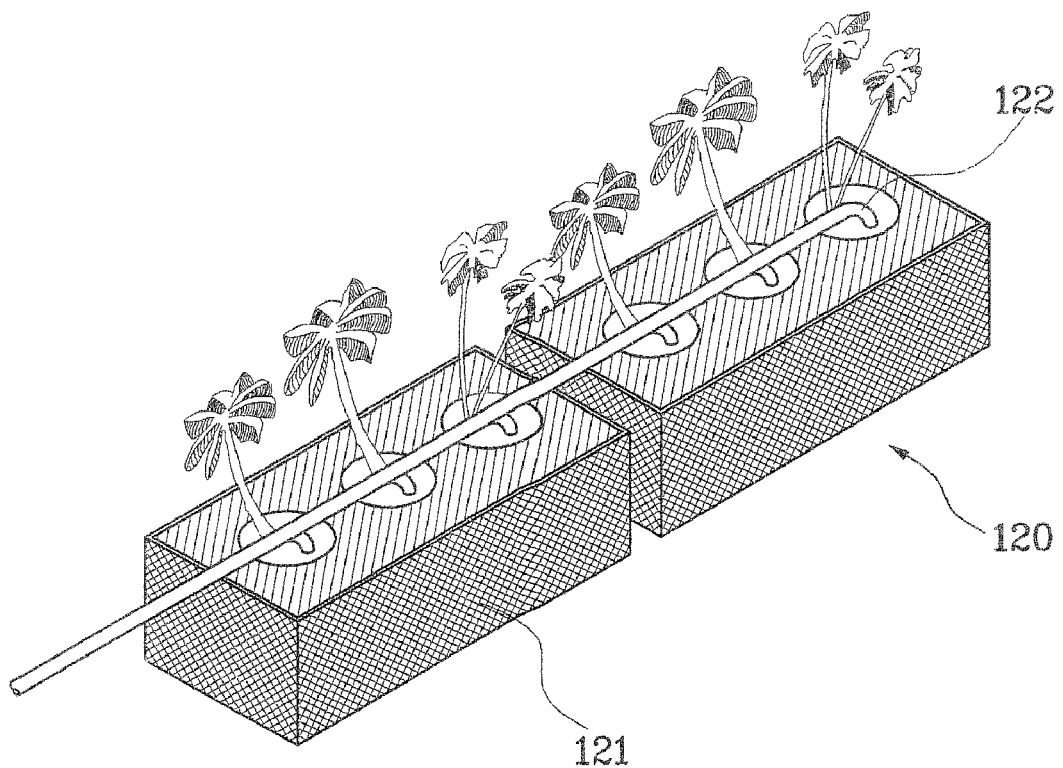
FIG. 5 is a detailed perspective view illustrating a nutrient solution cultivation device of the present invention.

FIG. 2 is a side view illustrating an apparatus for tracking and condensing sunlight of a sliding type according to the present invention, FIG. 3 is a plane view of FIG. 2, FIG. 4 is a side view illustrating the apparatus of FIG. 2 when it is provided with a watering equipment, and FIG. 5 is a detailed perspective view illustrating a nutrient solution cultivation device of the present invention.

As illustrated in the drawings, the apparatus for tracking and condensing sunlight of the sliding type according to the present invention includes a light tracking and driving controller 100, a solar module plate 101, an upper structure 102, a bearing 103, a rotation shaft 104, a rotation plate 105, a rotation push rod 106, a rack pinion 107, a roller guide 108, a driven pipe 109, a rack pinion support beam 110, a rotation push rod roller 111, a motor 112, a driving pipe 113, a lower structure 114, a roller link 115, a watering equipment 116, a spring cooler 119 and a nutrient solution cultivation device 120.

The lower structure 114, which is formed on a bottom surface, may be a bar-shaped structure such as a general H beam.

While the prior art causes many environmental problems such as washout due to a concrete base, the present invention can easily set a pitch on an inclined surface using a special lower structure 114.

The upper structure 102 is formed on a top end of the lower structure 114 in the shape of an inverse triangle, i.e., A, and has a space portion at the center. The rotation shaft 104 including the bearing 103 is formed on a top end of the upper structure 102.

The solar module plate 101 condenses sunlight. The solar module plate 101 is called a solar battery. As publicly known, the solar battery, which converts energy of sunlight into electric energy, produces electricity using two types of semiconductors, a P-type semiconductor and an N-type semiconductor. When light is irradiated on the solar battery, electrons and holes are generated therein, and generated electric charges move to P and N poles, so that a potential difference occurs between P pole and N pole. Here, when load is connected to the solar battery, a current starts to flow.

In addition, in a large-sized system, the solar battery module takes power out by connecting several solar batteries in series and parallel. A cell is a minimum unit to produce electricity, and a module is a minimum unit to take electricity out and has half a size of a front door. An array indicates several panels fitted in series and parallel. A sub-array is a unit to arrange several modules for convenience in installation works or maintenance and repair.

The solar module plate 101 is formed on a top surface of the rotation plate 105. The rotation plate 105 pivots in the left-right direction as a central portion of a bottom surface thereof is fixed to a top end of the rotation shaft 104. Particularly, the left and right sides of the rotation plate 105 are preferably arranged from the east to the west according to a traveling direction of the sun.

The roller guide 108 is located in the space portion at the center of the upper structure 102, and formed in the shape of a downwardly-convex semicircular curve along a rotation radius around the rotation shaft 104.

The rotation push rod roller 111 is formed to be movable with the roller guide 108.

In addition, the rotation push rods 106 have one ends fixed to both sides of the bottom surface of the rotation plate 105, and the other ends hinge-coupled to the rotation push rod roller 111.

Particularly, the respective rotation push rods 106 are formed in the shape of a bracket such that one ends thereof are fixed to four-side edges of the bottom surface of the rotation plate 105, respectively, and the other ends thereof are hinge-coupled to one point of the rotation push rod roller 111. Therefore, the force balance is maintained to be '0' in one point, i.e., in the rotation push rod roller 111, to thereby maximize structural stability.

Moreover, the rotation push rods 106 change an angle of the rotation plate 105 according to the movement of the rotation push rod roller 111, and support and fix the rotation plate 105.

The motor 112 is formed on the lower structure 114. The motor 112, which produces a rotational force, may be provided with a reduction gear (not shown) for example, or implemented into a worm geared motor including a built-in reduction gear.

Preferably, the motor 112 may rotate normally and reversely according to a size of a signal output from the light tracking and driving controller 100 discussed later.

The rack pinion 107 converts a rotational motion of the motor 112 into a linear motion.

The rack pinion support beam 110 is formed on the lower structure 114 in the same direction as the rack pinion 107 to support the rack pinion 107.

The driven pipe 109 is formed on the lower structure 114 and coupled to the rack pinion 107 on an extended line to perform a linear motion in the left-right direction.

The roller link 115 has one side hinge-coupled to the driven pipe 109 and the other side hinge-coupled to the rotation push rod roller 111, and moves the rotation push rod roller 111 along the roller guide 108 in the rotation radius, when the driven pipe 109 moves horizontally.

The watering equipment 116 is formed in the space portion at the center of the upper structure 112 to supply water to a lower portion. Here, plants are grown below the upper structure 102. Particularly, as it is shadowed, shade plants are preferably grown.

Also, the spring cooler 119 is formed at one side of the rotation plate 105 to spray water to the surface of the solar module plate 101. Accordingly, the sprayed water serves to wash and cool the solar module plate 101.

In addition, the nutrient solution cultivation device 120 is formed below the upper structure 102 to accommodate the plants and supply a nutrient solution thereto. To this end, as illustrated in FIG. 5, the nutrient solution cultivation device 120 includes a plurality of nutrient solution cultivation ports 121 which accommodate the plants, and a nutrient solution supply tube 122 which is connected to the plurality of nutrient solution cultivation ports 121 to supply the nutrient solution thereto, respectively.

Moreover, the apparatus of the present invention may further include the light tracking and driving controller 100 which tracks an orbit or altitude of the sun and outputs signals of different sizes according to the tracked orbit or altitude of the sun.

Here, the motor 112 rotates normally and reversely according to the sizes of the signals output from the light tracking and driving controller 100, to pivot the plurality of rotation plates 105 with the solar module plate 101 formed thereon in the left-right direction and change angles thereof according to sunlight.

The light tracking and driving controller 100 tracks the orbit or altitude of the sun. For example, the light tracking and driving controller 100 is attached with two or more optical sensors (not shown), and tracks a point where amounts of light entering the two or more optical sensors are the same, to thereby ensure maximum energy efficiency. Since it can be easily constructed according to the well-known prior art, detailed explanation thereof is omitted.

According to the apparatus of the present invention so constructed, the light tracking and driving controller 100 tracks the orbit or altitude of the sun, and outputs signals of different sizes according to the tracked orbit or altitude of the sun.

The motor 112 rotates normally and reversely according to the sizes of the signals output from the light tracking and driving controller 100, to pivot the plurality of rotation plates 105 with the solar module plate 101 formed thereon in the left-right direction and change angles thereof according to sunlight.

That is, the rack pinion 107 converts a rotational motion of the motor 112 into a linear motion, and the driven pipe 109 is coupled to the rack pinion 107 to perform a linear motion in the left-right direction.

The roller link 115 which has one side hinge-coupled to the driven pipe 109 and the other side hinge-coupled to the rotation push rod roller 111 moves the rotation push rod roller 111 along the roller guide 108 in the rotation radius, when the driven pipe 109 moves horizontally.

Accordingly, the rotation plate 105 is pivoted by the respective rotation push rods 106 which have one ends fixed to both sides of the bottom surface of the rotation plate 105 and the other ends hinge-coupled to the rotation push rod roller 111.

Here, the solar module plate 101 is formed on the top surface of the rotation plate 105. The rotation plate 105 pivots in the left-right direction, as the central portion of the bottom surface thereof is fixed to the top end of the rotation shaft 104.

Therefore, the solar module plate 101 can always maintain an optimum angle to condense sunlight according to the orbit or altitude of the sun tracked by the light tracking and driving controller 100.

Figure 6:
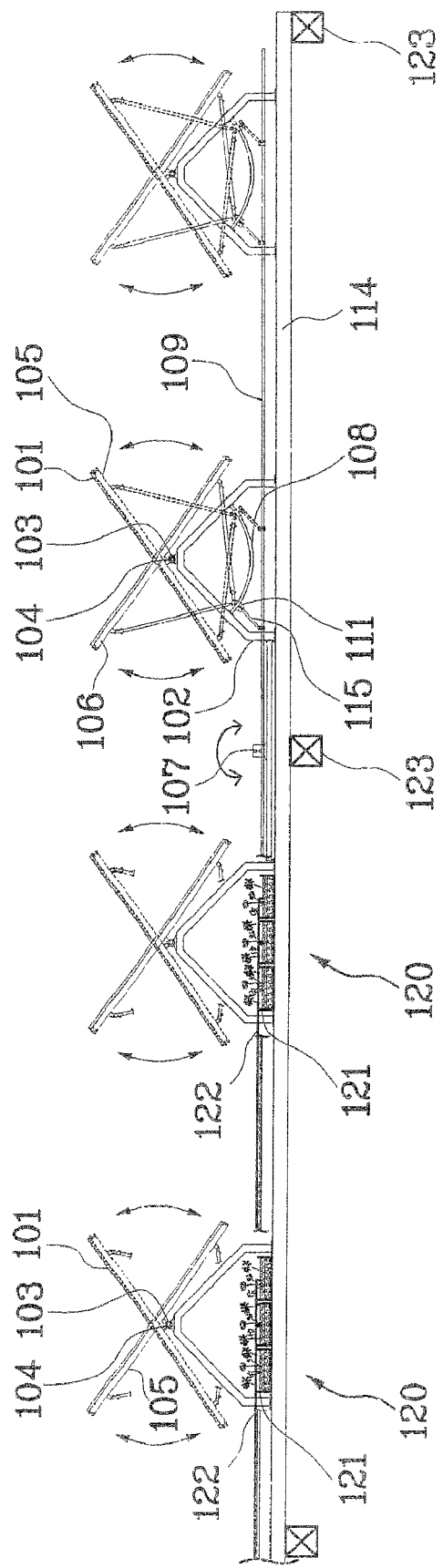
FIG. 6 is a side view illustrating an apparatus for tracking and condensing sunlight of a sliding type according to the present invention, when it is provided in a plural number.
Figure 7:
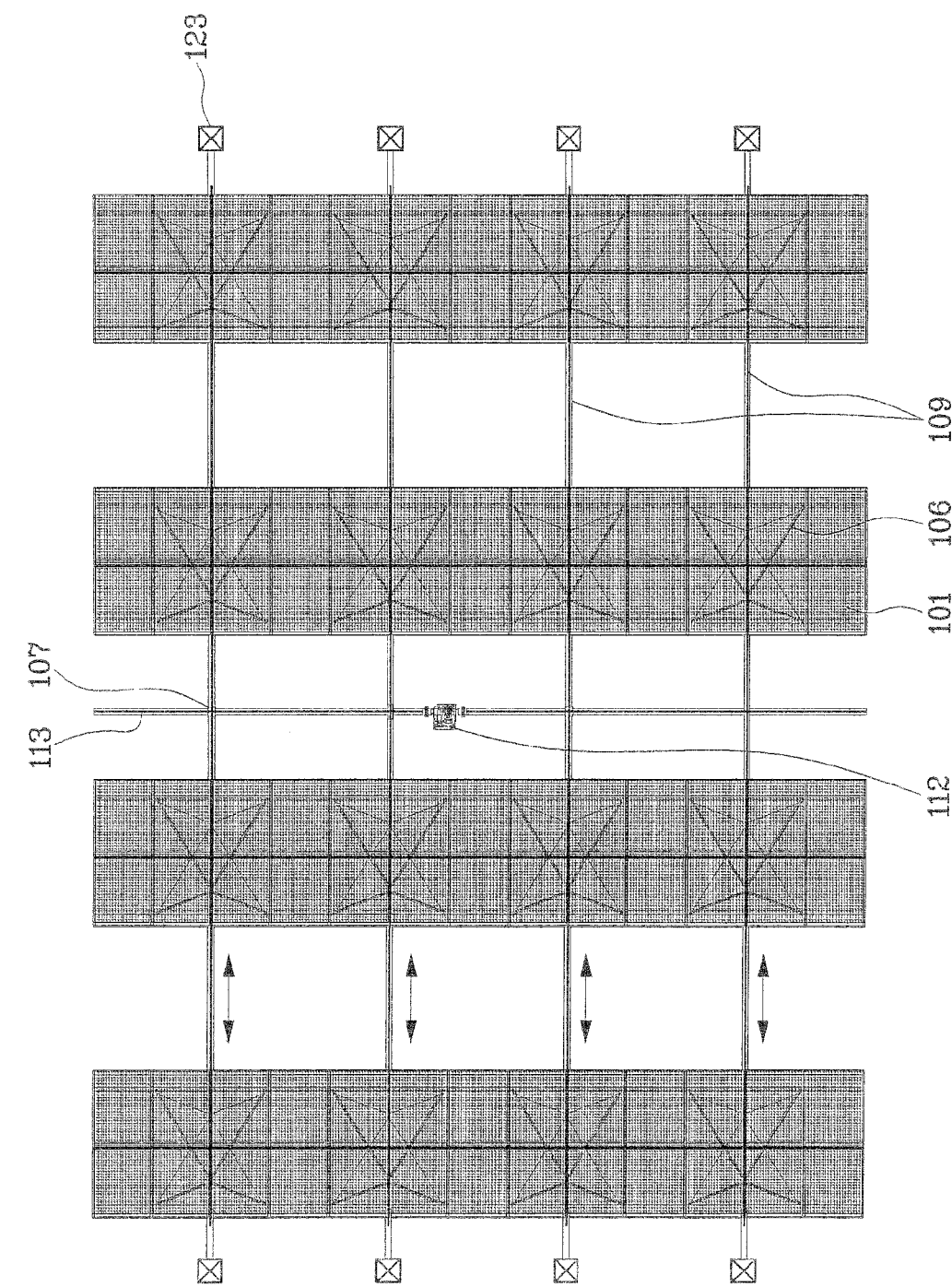
FIG. 7 is a plane view of FIG. 6.
Figure 8:
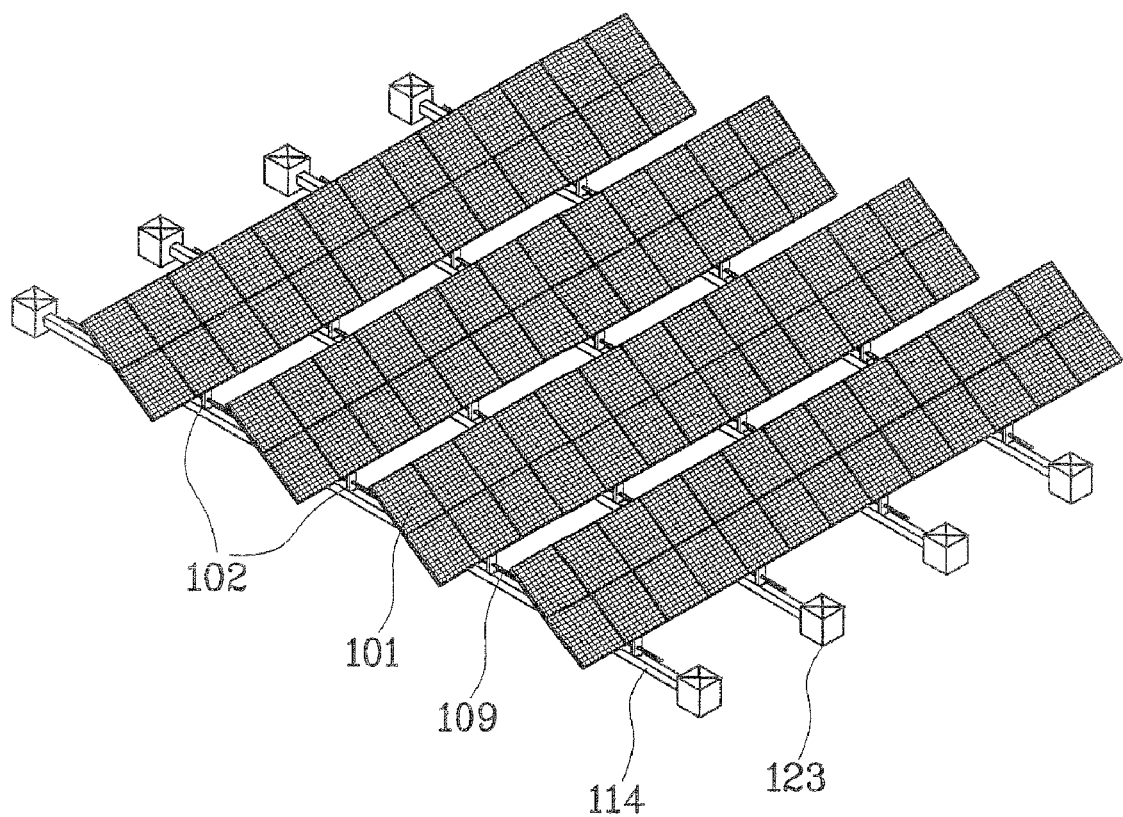
FIG. 8 is a perspective view of FIG. 6.

FIG. 6 is a side view illustrating an apparatus for tracking and condensing sunlight of a sliding type according to the present invention, when it is provided in a plural number, FIG. 7 is a plane view of FIG. 6, and FIG. 8 is a perspective view of FIG. 6.

As described above, the apparatus for tracking and condensing sunlight of the sliding type according to the present invention includes a light tracking and driving controller 100, a solar module plate 101, an upper structure 102, a bearing 103, a rotation shaft 104, a rotation plate 105, a rotation push rod 106, a rack pinion 107, a roller guide 108, a driven pipe 109, a rack pinion support beam 110, a rotation push rod roller 111, a motor 112, a driving pipe 113, a lower structure 114, a roller link 115, and a watering equipment 116.

Here, the apparatus further includes a driving pipe 113 which is extended in a lateral direction to rotate with the motor 112.

Accordingly, a plurality of rack pinions 107 and a plurality of driven pipes 109 corresponding thereto are further formed on the driving pipe 113 at certain intervals to interoperate with each other.

In this construction, when the motor 112 rotates, the driving pipe 113 rotates in the same direction, so that the plurality of rack pinions 107 and the plurality of driven pipes 109 coupled thereto move in the front-rear direction.

As a result, the plurality of solar module plates 101 are batch-controlled to interoperate with each other, so that they can always maintain an optimum angle to condense sunlight according to the tracked orbit or altitude of the sun.

Figure 9:
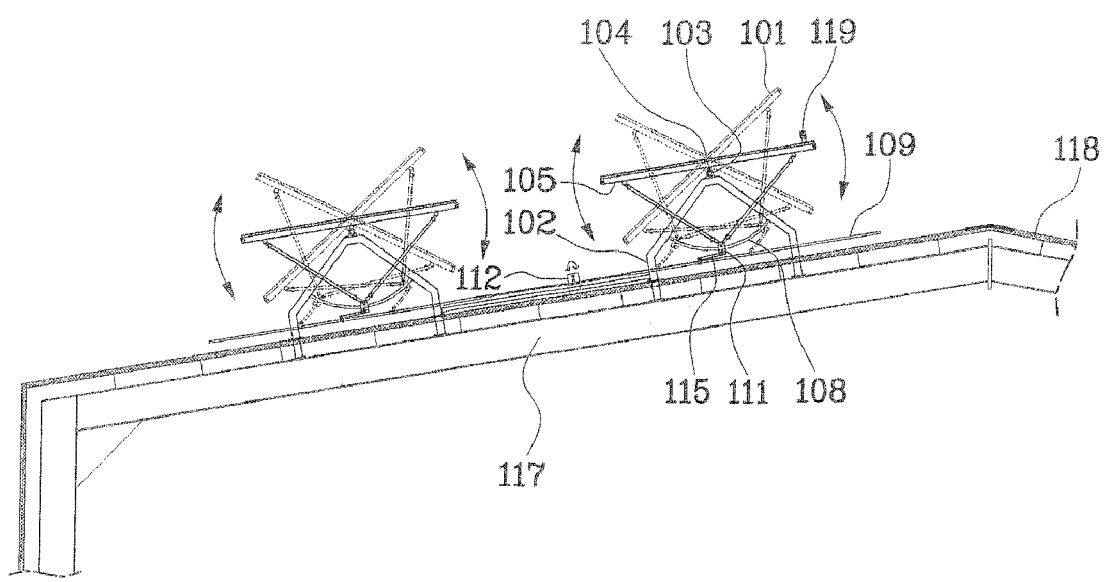
FIG. 9 is a side view illustrating an apparatus for tracking and condensing sunlight of a sliding type according to the present invention, when it is installed on a top end of a roof truss.

FIG. 9 is a side view illustrating an apparatus for tracking and condensing sunlight of a sliding type according to the present invention, when it is installed on a top end of a roof truss.

As described above, the apparatus for tracking and condensing sunlight of the sliding type according to the present invention includes a light, tracking and driving controller 100, a solar module plate 101, an upper structure 102, a bearing 103, a rotation shaft 104, a rotation plate 105, a rotation push rod 106, a rack pinion 107, a roller guide 108, a driven pipe 109, a rack pinion support beam 110, a rotation push rod roller 111, a motor 112, a driving pipe 113, a lower structure 114, a roller link 115, a watering equipment 116, a roof truss 117, and a sandwich panel 118.

Here, the lower structure 114 is a roof truss 117, and the upper structure 102 can be fixed with the sandwich panel 118 formed on a top end of the roof truss 117.

The sandwich panel 118 on the top end of the roof truss 117 constitutes a building with a slab or triangular roof. The upper structure 102 may be coupled to the roof truss 117 by general bolts and nuts.

INDUSTRIAL APPLICABILITY

Therefore, according to the present invention, the apparatus for tracking and condensing sunlight of the sliding type tracks the position of sunlight according to variations of the altitude or orbit of the sun and pivots the solar module plate so as to maximize condensing efficiency.

In addition, the apparatus for tracking and condensing sunlight of the sliding type can provide the structure strong against wind or load by firmly fixing the means for fixing the solar module plate to the inclined ground or inclined building surface and pivoting the solar module plate to the bottom by the frame structure, without using the concrete base which is harmful to natural environment.

Moreover, while the prior art causes many environmental problems such as washout due to the concrete base, the present invention takes an economical advantage because the pitch can be easily set on the inclined surface using the special lower structure.

The scope of the present invention is not limited to the embodiment described and illustrated above but is defined by the appended claims. It will be apparent that those skilled in the art can make various modifications and changes thereto within the scope of the invention defined by the claims. Therefore, the true scope of the present invention should be defined, by the technical spirit of the appended claims.

The invention claimed is:

1. An apparatus for tracking and condensing sunlight of a sliding type, comprising:
   a lower structure;
   an upper structure which is formed on a top end of the lower structure in the shape of an inverse triangle and has a space portion at the center, a rotation shaft including a bearing being formed on a top end of which;
   a solar module plate which condenses sunlight;
   a rotation plate which pivots in the left-right direction as a central portion of a bottom surface of which is fixed to a top end of the rotation shaft, the solar module plate being formed on a top surface of which;
   a roller guide which is formed in the space portion at the center of the upper structure along a rotation radius around the rotation shaft;
   a rotation push rod roller which is formed to be movable with the roller guide;
   respective rotation push rods which have one ends fixed to both sides of the bottom surface of the rotation plate and the other ends hinge-coupled to the rotation push rod roller;
   a motor which is formed on the lower structure;
   a rack pinion which converts a rotational motion of the motor into a linear motion;
   a driven pipe which is formed on the lower structure and coupled to the rack pinion to perform a linear motion in the left-right direction; and
   a roller link which has one side hinge-coupled to the driven pipe and the other side hinge-coupled to the rotation push rod roller, and moves the rotation push rod roller along the roller guide in the rotation radius, when the driven pipe moves horizontally.

2. The apparatus as claimed in claim 1, further comprising a driving pipe which is extended in a lateral direction to rotate with the motor,
   wherein a plurality of rack pinions and a plurality of driven pipes corresponding thereto are further formed on the driving pipe at certain intervals to interoperate with each other.

3. The apparatus as claimed in claim 1, wherein the respective rotation push rods are formed in the shape of a bracket such that one ends thereof are fixed to four-side edges of the bottom surface of the rotation plate, respectively, and the other ends thereof are hinge-coupled to one point of the rotation push rod roller.

4. The apparatus as claimed in claim 1, further comprising a rack pinion support beam which is formed on the lower structure in the same direction as the rack pinion to support the rack pinion.

5. The apparatus as claimed in claim 1, further comprising:
   a watering equipment which is formed in the space portion at the center of the upper structure to supply water to a lower portion;
   a spring cooler which is formed at one side of the rotation plate to spray water to the surface of the solar module plate; and
   a nutrient solution cultivation device which is formed below the upper structure to accommodate plants and supply a nutrient solution thereto.

6. The apparatus as claimed in claim 1, further comprising a light tracking and driving controller which tracks an orbit or altitude of the sun and outputs signals of different sizes according to the tracked orbit or altitude of the sun,
   wherein the motor rotates normally and reversely according to the sizes of the signals output from the light tracking and driving controller, to pivot the plurality of rotation plates with the solar module plate formed thereon in the left-right direction and change angles thereof according to sunlight.

7. The apparatus as claimed in claim 1, wherein the lower structure is a roof truss, and the upper structure is fixed with a sandwich panel formed on a top end of the roof truss.

* * * * *